United States Patent
Papoutsis et al.

(10) Patent No.: US 7,035,635 B2
(45) Date of Patent: Apr. 25, 2006

(54) METHOD FOR TRANSMITTING SIGNALS IN A RADIO COMMUNICATIONS SYSTEM

(75) Inventors: Georgios Papoutsis, Berlin (DE); Jörg Schniedenharn, Berlin (DE)

(73) Assignee: Siemens Aktiengesellschaft, Munich (DE)

( * ) Notice: Subject to any disclaimer, the term of this patent is extended or adjusted under 35 U.S.C. 154(b) by 130 days.

(21) Appl. No.: 10/344,325

(22) PCT Filed: Aug. 13, 2001

(86) PCT No.: PCT/DE01/03101

§ 371 (c)(1),
(2), (4) Date: Jul. 17, 2003

(87) PCT Pub. No.: WO02/15616

PCT Pub. Date: Feb. 21, 2002

(65) Prior Publication Data

US 2004/0048625 A1    Mar. 11, 2004

(30) Foreign Application Priority Data

Aug. 11, 2000   (DE) ................................ 100 39 429

(51) Int. Cl.
H04Q 7/20       (2006.01)
(52) U.S. Cl. ................................ 455/432.2; 370/395.5; 370/466

(58) Field of Classification Search ............ 455/412.1, 455/412.2, 432.2, 434, 435.2, 458, 466, 418, 455/419; 370/324, 395.5, 466, 467
See application file for complete search history.

(56) References Cited

U.S. PATENT DOCUMENTS

| | | | |
|---|---|---|---|
| 5,396,653 A * | 3/1995 | Kivari et al. | 455/88 |
| 5,857,153 A | 1/1999 | Lupien | |
| 5,924,026 A * | 7/1999 | Krishnan | 455/414.1 |
| 6,058,115 A * | 5/2000 | Sawyer et al. | 370/401 |
| 6,088,342 A * | 7/2000 | Cheng et al. | 370/320 |
| 6,353,620 B1 * | 3/2002 | Sallberg et al. | 370/465 |
| 6,546,261 B1 * | 4/2003 | Cummings | 455/552.1 |
| 6,657,984 B1 * | 12/2003 | Semper | 370/338 |
| 6,687,901 B1 * | 2/2004 | Imamatsu | 717/173 |

FOREIGN PATENT DOCUMENTS

WO        WO 99/33288         7/1999

* cited by examiner

Primary Examiner—William Trost
Assistant Examiner—James D. Ewart
(74) Attorney, Agent, or Firm—Staas & Halsey LLP

(57) ABSTRACT

According to the invention, a message belonging to a protocol is signalled by a base station subsystem (BSS) in a radio communications system to user equipment (UE), said message consisting of at least one message element. The changes to the message elements in comparison to an older version of the message are signalled at the beginning of the message.

7 Claims, 3 Drawing Sheets

Version 1a: | KE='0' | element1 | element2 | NE=0 |

Version 1b: | KE='0' | element1 | element2 | NE=1 | element3 | NE=0 |

Version 2: | KE='10' | element1a | element3 | element4 | NE=0 |

KE: Number of critical expansions with respect to the first version of the protocol.
"0": No critical expansions,  "10": A critical expansion.
NE: Non-critical expansion (1: included, 0: not included)

FIG 2

Version 1a:

| element1 | element2 | KE=0 | NE=0 |

Version 1b:

| element1 | element2 | KE=0 | NE=0 | element3 | NE=0 |

Version 2:

| element1 | element2 | KE=1 | NE=1 | element3 | NE=0 | element4 | element1a | KE=0 | NE=0 |

KE: Critical expansion     1: Included
NE: Non-critical expansion     0: Not included

FIG 3

Version 1a: | KE='0' | element1 | element2 | NE=0 |

Version 1b: | KE='0' | element1 | element2 | NE=1 | element3 | NE=0 |

Version 2: | KE='10' | element1a | element3 | element4 | NE=0 |

KE: Number of critical expansions with respect to the first version of the protocol.
"0": No critical expansions, "10": A critical expansion.
NE: Non-critical expansion (1: included, 0: not included)

METHOD FOR TRANSMITTING SIGNALS IN A RADIO COMMUNICATIONS SYSTEM

CROSS REFERENCE TO RELATED APPLICATIONS

This application is based on and hereby claims priority to PCT Application No. PCT/DE01/03101 filed on 13 Aug. 2001 and German Application No. 100 39 429.9 filed on 11 Aug. 2000, the contents of which are hereby incorporated by reference.

BACKGROUND OF THE INVENTION

The invention relates to a method for signal transmission in a radio communications system. The invention is particularly suitable for use in a mobile radio or wire-free subscriber access system.

In radio communications systems, for example the second-generation European mobile radio system GSM (Global System for Mobile Communications), information (for example speech, picture information or other data) is transmitted by electromagnetic waves via a radio interface. The radio interface relates to a connection between a base station and subscriber stations, in which case the subscriber stations may be mobile stations or fixed-position radio stations. The electromagnetic waves are in this case emitted at carrier frequencies which are in a frequency band that is intended for the respective system. Frequencies in the frequency band around 2000 MHz have been provided for future radio communications systems, for example the UMTS (Universal Mobile Telecommunication System) or other third-generation systems. Two modes are envisaged for the third generation of mobile radios, with one mode being referred to as the FDD mode (Frequency Division Duplex), and the other mode being referred to as the TDD mode (Time Division Duplex). These modes are each used in different frequency bands. Both modes support a so-called CDMA (Code Division Multiple Access) subscriber separation method.

One important factor in the development of mobile radio systems is to ensure that each new version of a protocol is compatible with older versions. This ensures in particular that more recent subscriber terminals can be correctly identified and addressed in an environment of base stations which support an older protocol version and, conversely, the subscriber terminals which support an older protocol version still operate correctly in new network environments. However, this is not intended to prevent the existing messages at the control level between a subscriber terminal and base station from being expanded in order to support new services or features. For this purpose, all the signaling messages must provide a type of expansion mechanism in order that the same message may in more recent versions of the protocol include new elements, without this adversely affecting the functionality of "old" receivers.

In the case of these new expansions, a distinction is drawn in the described UMTS mobile radio system, by way of example, between critical and non-critical expansions. If the receiver of a message identifies a new element which it cannot decode (since, for example, it is defined in a newer version which the receiver does not yet know) and this element is identified as being critical, it should reject the message as being incomprehensible. The transmitter uses this rejection to deduce that the receiver supports an older version of the protocol, and the message is repeated without the additional elements of the new version. If the receiver sees an unknown element which is identified as being non-critical in the message, then it should ignore this element and attempt to decode the rest of the message correctly. When developing expansion mechanisms, it is important to minimize the necessary message overhead, and to ensure that it is possible to switch to the correct protocol version (the latest which both ends can understand) with the minimum delay.

Solutions with respect to expansions of communications protocols have been proposed for two problems:

Problem 1:

In the case of the communications protocols (for example in the radio resource part) which are known from the related art for the GSM and UMTS mobile radio system, expansion mechanisms are implemented by reserving space at the end of a message, which can be filled with expansions and which may, for example, also have a so-called flag (indicator) (for example for UMTS) that the expansion has been identified as being critical or non-critical. This has the disadvantage that the messages become larger with each new version, since there are no mechanisms to shorten the message, that is to say elements from older protocol versions cannot be removed. The current expansion is thus always at the end of the previous version.

Problem 2:

If a subscriber terminal receives a message with a critical expansion (for example in the case of UMTS) which it does not understand, then the entire message is rejected and the network makes another attempt, using the same message but with an older version of the protocol. When selecting the older version of the message, the network cannot, according to the related art, make use of any information whatsoever about protocol versions which the subscriber terminal does understand. The simplest solution for a network would thus be to use the oldest version of the protocol, for which the network can assume that every subscriber terminal supports it. However, this means that the latest version, which the subscriber terminal could support, would never be used. A further option would be to in each case always send the next older version of the message to the subscriber terminal. If necessary, this procedure might have to be repeated more than once, for example if there is a large version difference between the transmitter and the receiver, and this can lead to a considerable delay in the protocol sequence.

SUMMARY OF THE INVENTION

One possible object for the invention relates to specifying a method which allows simplified protocol matching between components in a radio communications system.

The described method is used particularly advantageously in a radio communications system which is in the form of a mobile radio system or wire-free subscriber access system and which, in particular, uses a TDMA and/or CDMA subscriber separation method.

BRIEF DESCRIPTION OF THE DRAWINGS

These and other objects and advantages of the present invention will become more apparent and more readily appreciated from the following description of the preferred embodiments, taken in conjunction with the accompanying drawings of which:

FIG. 2 shows one possible implementation of protocol expansions, if these are possible only at the end of the previous version, and FIG. 3 shows a further possible implementation of protocol expansions.

DETAILED DESCRIPTION OF THE PREFERRED EMBODIMENT

Figure 1:
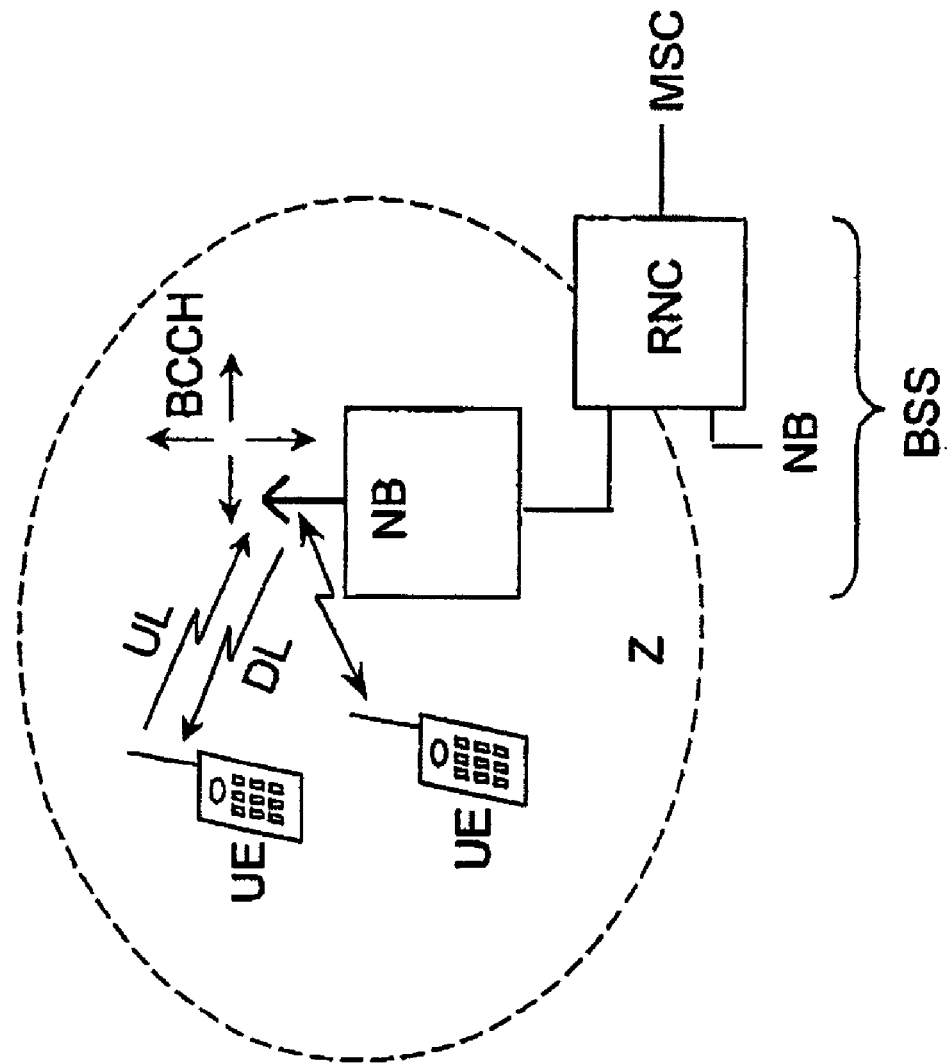
FIG. 1 shows a block diagram of a radio communications system.

Reference will now be made in detail to the preferred embodiments of the present invention, examples of which are illustrated in the accompanying drawings, wherein like reference numerals refer to like elements throughout.

FIG. 1 shows a part of a mobile radio system as an example of the structure of a radio communications system. A mobile radio system in each case comprises a large number of mobile switching centers MSC, which are part of a switching network (SSS—Switching Subsystem) and are networked to one another, and/or produce access to a landline network, and in each case one or more base station systems BSS (BSS—Base Station Subsystem) which are connected to these mobile switching centers MSC. A base station system BSS in turn has at least one device RNC (RNC—Radio Network Controller) for assigning radio resources, as well as at least one base station NB (NB—Node B), which is in each case connected to it.

A base station NB can set up connections via a radio interface to subscriber stations UE (UE—User Equipment). Each base station NB forms at least one radio cell Z. The size of the radio cell Z is generally governed by the range of an organization channel (BCCH—Broadcast Control Channel) which is transmitted by the base stations NB at an increased and constant transmission power level. In the case of sectorization or in the case of hierarchical cell structures, each base station NB may also supply a plurality of radio cells Z. The functionality of this structure can be transferred to other radio communications systems in which the described method may be used.

The example in FIG. 1 shows two subscriber stations UE which are located in the radio cell Z of the base station NB. The subscriber stations UE have each set up a communications link to the base station NB on which signal transmission for a chosen service is taking place in the uplink direction UL and in the downlink direction DL. The communications links are separated, for example, by different spread codes (CDMA codes) being allocated to the subscriber stations UE.

During the connection, the subscriber stations UE and the base station NB still evaluate transmission characteristics of the radio interface periodically, by a channel estimate.

In order to solve the problem 1 as described in the introduction, the inventors propose that the number of critical changes contained in the message be signaled right at the start of the message. Any change may in this case comprise expansions in the previous sense, or else may include removing or changing already existing elements. One advantage of this method is that the receiver does not have to start decoding the message when it identifies that the start of the message contains unknown critical elements, which leads to rejection of the message. In addition, this method has the advantage that the new message is not linked to the structure of the old message, and there is therefore no longer any need to transmit elements that are no longer required.

The non-critical expansions may, according to the related art, be located at the end of the message since, in this case, the message is not rejected, and therefore the start of the message must be decoded in any case. Thus, overall, the message comprises three parts. The first part is an integer which indicates how many critical changes have been implemented in this message since the first version of the protocol. This number may be coded, for example, using any desired (binary) coding which satisfies a so-called Fano condition (there is no code word at the start of another code word). The second part contains the current version of the message (as it is identified on the basis of the corresponding number of changes). The third part contains one or more non-critical expansions. Before each of these expansions, one bit signals that another is still to follow, and one bit after the last signals that this was the last.

Accordingly, the process of identifying the expansions, which until now has been distributed over all the changed message elements, is now drawn to the start of the message. The bit sequence is then used either directly as a version code, or may be additionally coded subsequently, as well. The advantage is firstly that the receiver can immediately identify at the start of the decoding process whether it will understand this version. Furthermore, there is no longer any need to leave the previous version unchanged, for example an element which has been replaced in the meantime can also be deleted.

The following proposal has been made in order to solve the problem 2 as described in the introduction. If expansion mechanisms are implemented by using expansion bits, then these expansion bits can be interpreted as version numbers of the message. The receiver can use the rejection message to signal how many expansions it can identify in the message, as a maximum. The transmitter can in consequence select the correct version of the message straight away on the next attempt, without having to try out all the intermediate versions.

A further option is to insert a so-called identifier of an information element of the latest version of the message in the rejection message. The inventors propose that this information element identifier be used for identification of one version of a message.

A third option is to insert version numbers of the messages, which are used only for the rejection message, explicitly in the protocol.

Information relating to critical expansions to a message is transmitted right at the start, so that each version of a message can be given a completely new structure. In contrast to methods where the protocol version is transmitted at the start of the message, each message is in this case individually given a specific version, so that the version counter is not incremented for all messages, but only for those messages which have also actually been changed.

The insertion of a version identification in the rejection message makes it possible to efficiently inform the network of the versions of a message that are supported.

The receiver will not only reject an incomprehensible version of a message, but will explicitly inform the transmitter of which version it does support. This avoids possibly unnecessary protocol operations, since the transmitter can use the "correct" version directly for the second attempt.

FIGS. 2 and 3 are intended to illustrate the described method. In this case, a message is considered in a protocol which contains two elements in the first version 1*a* (element1 and element2). The message has an additional element (element3) in the second version 1*b*, but this is not critical and can be ignored by a receiver which is using the older protocol version. In the third version 2, a critical element is attached (element4), the first element (element1) has been changed (element1*a*), and the third element (element2) is no longer used.

FIG. 2 shows the three versions of the messages for the situation where expansions can be inserted only at the end of the protocol, for example as will be possible on the basis of the current status of the UMTS standardization in the RRC (Radio Resource Control). In comparison to this, FIG. 3 shows one potential embodiment for messages based on the invention.

It is also possible to use the solution to the described problem 2 in this case. If a subscriber terminal which supports only version 1a of the message receives a higher version, then it can use the two expansion bits as an identification of the supported message version.

The version number for version 1a is in this case 00 (KE=0, NE=0).

The version number for version 1b is in this case 010 (KE=0, NE=1, NE=0).

The version number for version 2 is in this case 11000 (KE=1, NE=1, NE=0, KE=0, NE=0).

Alternatively, it is also feasible to use only the critical expansion bits as the basis.

The version number for version 1a is in this case 0 (KE=0).

The version number for version 1b is in this case 0 (KE=0).

The version number for version 2 is in this case 10 (KE=1, KE=0).

Version 1a and version 1b may, for example, use the same version number, since the only differences between them are in non-critical elements.

FIG. 2 shows one possible implementation of expansions, when these are possible only at the end of the previous versions.

FIG. 3 shows one possible implementation of expansions based on the described method. In this case, the number of critical expansions is defined by the number of leading bits that are set before the first unset bit. The number of critical expansions is in this case equivalent to the number of mutually independent versions of the message. A subscriber terminal which supports only version 1a may use versions 1a and 1b of the protocol. Version 1b may in this case possibly not be understood completely, but it can nevertheless be used on the basis of the non-critical expansions. Further codings, which will be familiar to those skilled in the art, are feasible.

The invention has been described in detail with particular reference to preferred embodiments thereof and examples, but it will be understood that variations and modifications can be effected within the spirit and scope of the invention.

The invention claimed is:

1. A method for signal transmission in a radio communications system, comprising:
   providing a message comprising at least one message element and containing an updated protocol;
   signaling the message to a subscriber terminal from a base station system; and
   signaling information regarding changes to the at least one message element in comparison to message elements for an older version of the protocol, the information regarding changes being signaled to the subscriber terminal at the start of the message.

2. The method as claimed in claim 1, wherein
   the method further comprises determining the number of changed message elements in the message in comparison to message elements for an older version of the protocol, and
   the number of changed message elements is signaled to the subscriber terminal as the information regarding changes.

3. The method as claimed in claim 1, wherein
   the message contains critical and non-critical message elements, and
   only the number of changed critical message elements is signaled to the subscriber terminal.

4. The method as claimed in claim 1, wherein the changed message elements represent at least one of additional message elements relative to the older version of the protocol, a removal of message elements relative to the older version of the protocol, and a change to message elements relative to the older version of the protocol.

5. A method for signal transmission in a radio communications system, comprising:
   signaling a message to a subscriber terminal from a base station system, the message comprising at least one message element and containing an updated version of a protocol;
   determining, at the subscriber terminal, the number of changed message elements in the message in comparison to message elements for an older version of the protocol, which is known to the subscriber terminal;
   signaling the base station system with the number of changed message elements;
   selecting, at the base station system, a version of the protocol, which is suitable for the subscriber terminal, based on the number of changed message elements; and
   signaling the subscriber terminal with a message containing the version of the protocol suitable for the subscriber terminal.

6. The method as claimed in claim 5, wherein
   the subscriber terminal cannot recognize a portion of the changed message elements, and
   the subscriber terminal signals the base station with the number of recognizable changed message elements.

7. A base station system in a wireless radio communications system, comprising:
   an analysis unit to analyze a message comprising at least one message element and containing an updated protocol, the analysis unit determining the number of changed message elements in the message in comparison to message elements for an older version of the protocol; and
   a transmitter to transmit the message to a wireless subscriber terminal, the transmitter transmitting the number of changed message elements at the beginning of the message.

* * * * *